United States Patent [19]
Brewer

[11] 3,788,071
[45] Jan. 29, 1974

[54] ALL-METAL CHECK VALVE FOR AIR INJECTION SYSTEM
[75] Inventor: Robert W. Brewer, Dayton, Ohio
[73] Assignee: General Motors Corporation, Detroit, Mich.
[22] Filed: June 29, 1972
[21] Appl. No.: 267,395

[52] U.S. Cl. ................... 60/293, 60/317, 137/525, 137/543.17, 251/DIG. 3
[51] Int. Cl. ...................... F01n 3/02, F16k 21/04
[58] Field of Search . 60/293, 317; 137/525, 543.17; 251/DIG. 3

[56] References Cited
UNITED STATES PATENTS

| | | | |
|---|---|---|---|
| 2,544,605 | 3/1951 | Mallory | 60/317 X |
| 2,649,685 | 8/1953 | Cohen | 60/293 |
| 1,998,695 | 4/1935 | White | 123/41.27 UX |
| 2,249,971 | 7/1944 | Mecorney | 137/543.17 X |
| 2,345,569 | 4/1944 | Flint | 60/293 X |
| 3,314,230 | 4/1967 | Vanderpoel | 60/293 |
| 1,073,338 | 9/1913 | Fairhurst | 137/525 |
| 1,695,069 | 12/1928 | Tuttle | 137/525 X |

FOREIGN PATENTS OR APPLICATIONS

| | | | |
|---|---|---|---|
| 671,526 | 9/1929 | France | 137/525.5 |

*Primary Examiner*—Al Lawrence Smith
*Attorney, Agent, or Firm*—Peter D. Sachtjen

[57] ABSTRACT

An all-metal check valve for an air injection system of an internal combustion engine includes a valve body defining a chamber between the valve inlet and the valve outlet in which a valve disc is operative to control fluid flow between an air pump and the exhaust manifolds. The valve disc has an outer ring attached to the valve body and a central valve element hingedly connected to the ring by a pair of arcuate flexible arms defined by a pair of concentric diametrically opposed C-shaped slots. The arms are normally flexed for biasing the valve element against a valve seat to block the reverse flow of exhaust gases therethrough. Injection air flow additionally flexes the arms to shift the valve element to an open position for permitting flow from the air pump to the exhaust manifolds.

1 Claim, 4 Drawing Figures

ALL-METAL CHECK VALVE FOR AIR INJECTION SYSTEM

This invention relates to check valves and, in particular, to a check valve for an air injection system of an internal combustion engine to prevent the reverse flow of exhaust gases in the system.

Air injection systems wherein an engine driven air pump supplies supplemental air to the engine exhaust ports to promote burning of residual combustibles require valves to prevent the reverse flow of exhaust gases therethrough. The valve must operate in a high temperature environment, have a positive checked position, and a low restriction unchecked position to permit the free flow of injection air from the pump to the ports. The present invention provides a check valve incorporating features which attain the above objectives. The check valve has an all-metal construction for high temperature operation and includes a metal valve disc for regulating fluid flow. The valve disc includes an annular outer ring fixedly connected to the valve body and a central circular valve element adapted to seat against the valve inlet and hingedly connected to the outer ring by a pair of flexible arcuate arms defined by a pair of concentrically disposed, diametrically opposed C-shaped slots. The arms are initially flexed to provide a closing bias against the inlet thereby insuring a positive checked position. The arms are additionally flexed by injection air flow to provide an easy opening unchecked position for free fluid flow to the exhaust ports.

The above and other features of the present invention will be apparent to one skilled in the art upon reading the following detailed description, reference being made to the accompanying drawings illustrating a preferred embodiment of the present invention in which.

Figure 1:
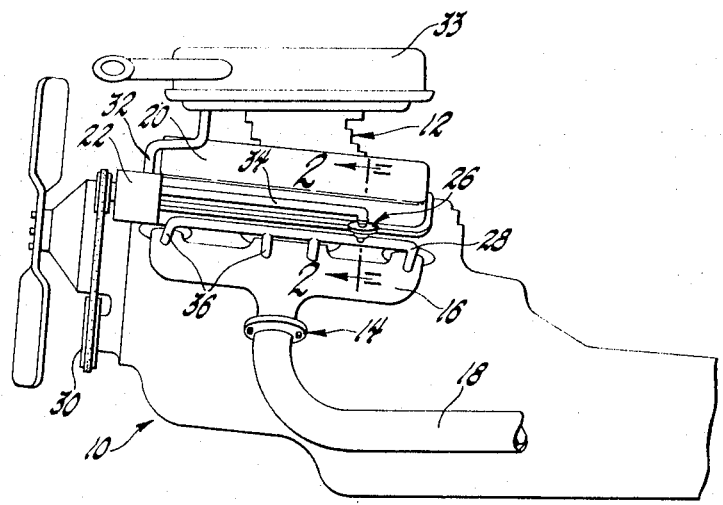
FIG. 1 is a side elevational view of an internal combustion engine having an air injection system incorporating an all-metal check valve made in accordance with the present invention.

Referring to FIG. 1, there is shown an internal combustion engine 10 having an air induction system 12 and an exhaust system 14 including an exhaust manifold 16 discharging exhaust gases from the engine cylinders through an exhaust pipe 18 to atmosphere. The engine 10 includes an air injection system 20 including an air pump 22, a check valve 26, and an air injection manifold 28. The illustrated engine 10 is of the V-type and includes a similar air injection manifold for the opposed bank of cylinders.

The air pump 22 is coupled to the engine crankshaft pulley 30 for operation in accordance with engine speed. The air pump 22 has an inlet line 32 fluidly connected at the air cleaner 33 of the air induction system 12 and an outlet line 34 fluidly connected to the check valve 26. The check valve 26 is fluidly connected to the air injection manifold 28 which has individual outlets 36 at the exhaust ports of the exhaust manifold 16. The check valve 26 prevents the reverse flow of exhaust gases from the exhaust manifold 16 to the air induction system 12 while permitting a substantially unrestricted flow of injection air from the air pump 22 to the exhaust manifold 16. This supplemental air promotes additional burning of residual combustibles discharged to the exhaust manifold 16 during engine operation.

Figure 2:
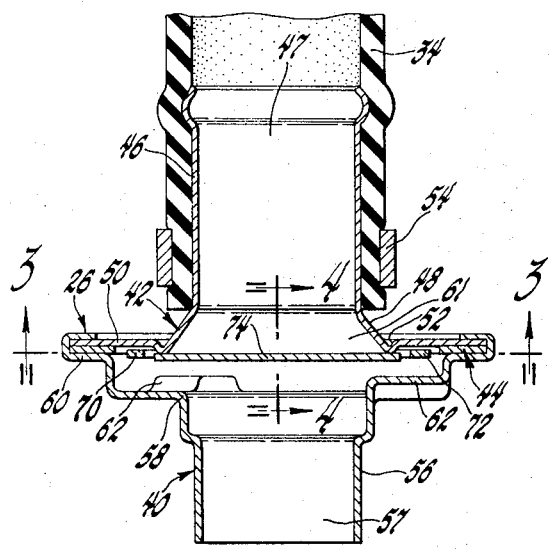
FIG. 2 is an enlarged view taken along line 2—2 of FIG. 1 showing the check valve in the closed position.

Referring to FIG. 2, the check valve 26 has an all-metal construction and comprises a base 40, a cover 42, and a valve disc 44. The cover 42 includes a cylindrical tube 46 defining an axial inlet passage 47, an intermediate frustoconical section 48, and an annular radial flange 50. An annular rib 52 at the transition between the section 48 and the flange 50 projects axially downward from the plane of the flange 50 and defines a circular valve seat. The end of the outlet line 34 is pressed over the outer surface of the tube 46 and is fixed thereto by a clamp 54.

The base 40 includes a cylindrical tube 56 defining an outlet passage 57, a stepped hub section 58, and an annular radial flange 60. The flange 60 is crimped over the flange 50 to fixedly assemble the base 40 and the cover 42 with the valve disc 44 being sandwiched therebetween. The interior surfaces of the sections 48 and 58 between the inlet passage 47 and the outlet passage 57 generally define a valving chamber 61. A plurality of inwardly projecting ledges 62 are formed in the hub section 58 and establish stop surfaces for the valve disc 44 as hereinafter described.

Figure 3:
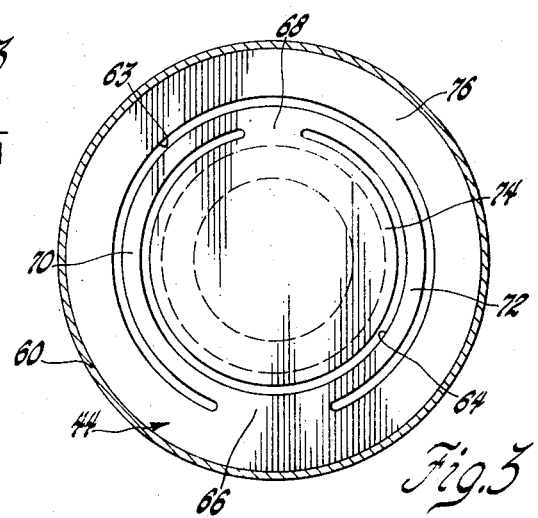
FIG. 3 is a view taken along line 3—3 of FIG. 2 showing the details of the valve disc.

Referring to FIG. 3, the metal valve disc 44 includes a pair of coaxial circumferentially overlapping C-shaped slots 63 and 64 having their ends defining therebetween a pair of diametrically opposed web sections 66, 68. The web sections 66, 68 are interconnected by a pair of flexible arcuate arms 70, 72. The arms 70, 72 are diametrically opposed and each respectively extends between the relatively rigid web sections 66, 68. The inner slot 64 inwardly defines a circular, disc check valve member 74. The outer slot 63 outwardly defines an annular outer ring 76, the periphery of which is clamped between the flanges 50 and 60.

As shown in FIG. 2, the check valve member 74 seats against the rib 52 in the closed or checked position. Inasmuch as the rib 52 projects axially beyond the flange 50, the arms 70, 72 are initially flexed to provide a closing bias when the air pump 22 is not operating. This closing bias will securely seat the valve member 74 to prevent the reverse flow of exhaust gases from the manifold 16 to the air induction system 12.

Figure 4:
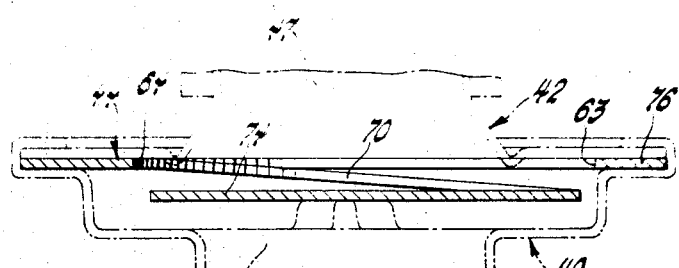
FIG. 4 is an enlarged view taken along line 4—4 of FIG. 2 showing the valve disc in the open position.

The injection air flow from the air pump 22 will urge the check valve member 74 to the open or unchecked position shown in FIG. 4 by additional flexing of the arms 70, 72. This will provide a substantially unrestricted cylindrical flow path past the valve member 74 for permitting the free flow of air from the pump 22. The ledges 62 engage the lower surface of the check valve member 74 to limit the opening movement.

The all-metal construction of the check valve 26 will withstand the high operating temperature associated with its proximity to the exhaust manifold 16. The self-seating of the valve element 74 will provide a positive checked condition to prevent the reverse flow of exhaust gases and the extremely long flexible sections defined by the arms 70, 72 will provide for substantially unrestricted injection air flow in the unchecked direction.

Although only one form of this invention has been shown and described, other forms will be readily apparent to those skilled in the art. Therefore, it is not intended to limit the scope of this invention by the embodiment selected for the purpose of this disclosure but only by the claim which follows.

What is claimed is:

1. In an air injection system of an internal combustion engine having an engine driven air pump fluidly connected to the engine exhaust manifold, an all-metal check valve for permitting the forward flow of air from the pump and blocking the reverse flow of exhaust gases from the exhaust manifold to the air pump comprising: a two-piece valve body defining a chamber, one piece of the valve body having an inlet for fluid connection to the exhaust manifold; the other piece of valve body having an outlet for fluid connection to the exhaust manifold; a circular valve disc in said chamber having an outer ring fixed between said one piece and said other piece, a first C-shaped slot formed in said valve disc radially inwardly of said outer ring defining a first web section between the ends thereof connected to said outer ring; a second C-shaped slot formed in said valve disc concentrically within said first C-shaped slot in circumferential overlapping relationship with said first web section; said second C-shaped slot defining a flexible valve concentrically within said outer ring and further defining a second web section between the ends thereof diametrically opposed to said first web section and joined to said valve disc, said slots defining therebetween a pair of diametrically opposed arcuate arms extending between said web sections each of said arms having greater flex than said web sections; and a projecting valve seat on said one piece of the valve body surrounding said inlet and engaging said flexible valve for initially flexing said arms between said relatively rigid diametrically opposed webs to provide a bias to a closed position of said valve against said seat for blocking the reverse flow of exhaust gases, said arms being further flexed by forward fluid flow from the air pump to position said valve in an open position with respect to said seat for permitting fluid flow from the chamber to the exhaust manifold.

* * * * *